(12) United States Patent
Kyung

(10) Patent No.: US 9,409,465 B2
(45) Date of Patent: Aug. 9, 2016

(54) COMBINATION STRUCTURE OF DOOR EQUIPPED ON VEHICLE

(71) Applicant: Hyundai Motor Company, Seoul (KR)

(72) Inventor: Jaehwan Kyung, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/552,015

(22) Filed: Nov. 24, 2014

(65) Prior Publication Data

US 2015/0283885 A1   Oct. 8, 2015

(30) Foreign Application Priority Data

Apr. 8, 2014   (KR) .................. 10-2014-0042017

(51) Int. Cl.
*B60J 5/04*   (2006.01)
*B60R 13/04*   (2006.01)

(52) U.S. Cl.
CPC ............... *B60J 5/0402* (2013.01); *B60R 13/04* (2013.01)

(58) Field of Classification Search
CPC .... B60J 5/0402; B60J 10/0054; B60J 10/008; B60J 10/085; B60J 10/086; B60J 10/088; B60R 13/04
See application file for complete search history.

(56) References Cited

U.S. PATENT DOCUMENTS

| | | | | |
|---|---|---|---|---|
| 2,793,071 A * | 5/1957 | Meyer | ...................... | B60J 10/02 126/214 A |
| 3,744,201 A * | 7/1973 | Dochnahl | ............ | B60J 10/0022 52/204.597 |
| 4,147,006 A * | 4/1979 | Kruschwitz | .......... | B60J 10/0022 52/204.599 |
| 7,762,021 B2 * | 7/2010 | Fujiwara | ................ | B60J 5/0402 29/509 |
| 8,205,389 B1 * | 6/2012 | Kesh | .................... | B60J 10/0022 49/440 |
| 8,782,954 B2 * | 7/2014 | Kawai | .................... | B60J 10/083 49/441 |
| 2002/0108313 A1 * | 8/2002 | Nozaki | ................. | B60J 5/0402 49/441 |
| 2003/0042756 A1 * | 3/2003 | Ogawa | ................... | B60J 5/0406 296/146.9 |
| 2004/0130179 A1 * | 7/2004 | Masunaga | ............. | B60J 5/0402 296/146.5 |
| 2008/0282616 A1 * | 11/2008 | Eguchi | ................ | B60J 10/0031 49/489.1 |
| 2009/0280353 A1 * | 11/2009 | Hirai | ...................... | B44C 1/221 428/687 |
| 2010/0026042 A1 * | 2/2010 | Ellis | ....................... | B60J 5/0402 296/146.2 |
| 2015/0130215 A1 * | 5/2015 | Im | ......................... | B60J 10/042 296/146.2 |
| 2015/0266364 A1 * | 9/2015 | Im | ........................ | B60J 10/0017 49/495.1 |

FOREIGN PATENT DOCUMENTS

| | | | | | |
|---|---|---|---|---|---|
| DE | 3538562 A1 | * | 10/1986 | .......... | B60J 10/0011 |
| DE | 4314123 A1 | * | 11/1994 | .......... | B60J 10/0051 |
| DE | 102008026046 A1 | * | 12/2009 | .......... | B60J 10/0051 |
| EP | 2594421 A1 | * | 5/2013 | .......... | B60J 10/0051 |

(Continued)

*Primary Examiner* — Glenn Dayoan
*Assistant Examiner* — Paul Chenevert
(74) *Attorney, Agent, or Firm* — Morgan, Lewis & Bockius LLP

(57) ABSTRACT

A combination structure of a door that is equipped on a vehicle may include an upper rail formed by bending a metal plate and disposed to correspond to an edge of a door glass, an inner panel disposed by a distance from the upper rail to form an insertion hole and one side of the inner panel is fixed to the upper rail, a frame molding in which a protrusion portion is formed on at least one side thereof and the protrusion portion is inserted into the insertion hole formed between the upper rail and the inner panel, a vehicle body disposed by a distance from the inner panel, and a first sealing member and a second sealing member.

6 Claims, 3 Drawing Sheets

(56) References Cited

FOREIGN PATENT DOCUMENTS

| | | | | |
|---|---|---|---|---|
| JP | 4314443 B2 | 5/2009 | | |
| JP | 4304445 B2 * | 7/2009 | ........... | B60J 10/0042 |
| JP | 4557674 B2 * | 10/2010 | ........... | B60J 10/0031 |
| JP | 2011-73505 A | 4/2011 | | |
| JP | 2012-106715 A | 6/2012 | | |
| JP | 5269686 B2 | 5/2013 | | |
| JP | 2013-244939 A | 12/2013 | | |
| JP | WO 2014163133 A1 * | 10/2014 | ............. | B60J 5/0402 |
| WO | WO 2007013275 A1 * | 2/2007 | ............. | B62D 25/04 |
| WO | WO 2011129157 A1 * | 10/2011 | ........... | B60J 10/0051 |
| WO | WO 2015049902 A1 * | 4/2015 | ............. | B60R 13/04 |

* cited by examiner

US 9,409,465 B2

COMBINATION STRUCTURE OF DOOR EQUIPPED ON VEHICLE

CROSS-REFERENCE TO RELATED APPLICATION

The present application claims priority to Korean Patent Application No. 10-2014-0042017 filed Apr. 8, 2014, the entire contents of which is incorporated herein for all purposes by this reference.

BACKGROUND OF THE INVENTION

1. Field of the Invention

The present invention is related to a combination structure of a door that is equipped on a vehicle that combines merits of a frame door and an invisible panel door to secure high level of appearance, stiffness, and assembly easiness.

2. Description of Related Art

A frame door has a structure in which the section of a roof portion of a vehicle is formed by a roll forming and the frame is exposed to an outside without a bright molding, and thus the quality of the appearance can be deteriorated.

An invisible panel door has a structure in which the panel is not exposed to an outside, a molding is added thereto together with a sealing member, and the quality of the appearance is high, but the assembly structure of the molding and the panel can be deteriorated.

Accordingly, the researches for improving the quality of the door appearance and simultaneously improving assembly easiness and stiffness have been being progressed.

The sensitivity of consumer is satisfied, the production cost of manufacture is saved, and simultaneously the stiffness is secured through this research such that overall stability of vehicle can be improved.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a combination structure of a door that is equipped on a vehicle having advantages of improving appearance quality, securing stiffness, and simultaneously assembly easiness such that the sensitivity of consumer is satisfied and the assembly easiness of the vehicle can be improved.

According to various aspects of the present invention, a combination structure of a door that is equipped on a vehicle may include an upper rail formed by bending a metal plate and disposed to correspond to an edge of a door glass, an inner panel disposed by a distance from the upper rail to form an insertion hole and one side of the inner panel is fixed on the upper rail, a frame molding in which an insertion portion is formed on at least one side thereof and the insertion portion is inserted into the insertion hole formed between the upper rail and the inner panel, a vehicle body disposed by a distance from the inner panel, and a first sealing member disposed on the upper rail to form a sealing structure with the door glass and a second sealing member disposed between the vehicle body and the inner panel to form another sealing structure.

The frame molding may include an exposure plate having outside surface exposed to an outside, and an insertion portion that protrudes from a central portion of an inner side surface of the exposure plate and is inserted into the insertion hole.

A protrusion may be formed on the insertion portion to be fixed on the insertion hole.

The insertion portion may include first and second elements that are disposed by a distance from each other and are fixed to each other, and the first element or the second element may be transformed to form the protrusion.

The upper rail and the inner panel may be respectively bent to form a protrusion groove at a position corresponding to the protrusion in the insertion hole.

The exposure plate and the insertion portion may be vertically disposed from each other and may be integrally bent to be formed.

The first element and the second element may face each other and the distance thereof may be elastically transformed such that the first element and the second element closely contact an inner side surface of the insertion hole.

A first arm that is bent toward an outside of the insertion hole to face an inner side surface of the exposure plate may be formed at an outside of the upper rail and a second arm that is bent toward the outside of the insertion hole corresponding to the first arm to face the inner side surface of the exposure plate may be formed at an outside of the inner panel.

A hook may be formed by bending both end sides of the exposure plate to be engaged with the first arm and the second arm respectively on the frame molding.

An inner side of the one side of the inner panel and an inner side of the upper rail may be fixed to each other through welding.

In accordance with the present invention for realizing the object, when a frame molding is combined with a door, the frame molding is not rotated and is moved in a side direction of a vehicle body to be combined with the door, such that the assembly easiness is improved and the maintenance can be simple.

The insertion portion and the protrusion of the frame molding may be made of SUS (stainless steel), the corrosion thereof is prevented, the durability thereof is improved, and a double sided adhesive tape is not used between the frame molding and the door and the insertion portion and the protrusion are inserted into the insertion hole such that the frame molding can be fixed on the door.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
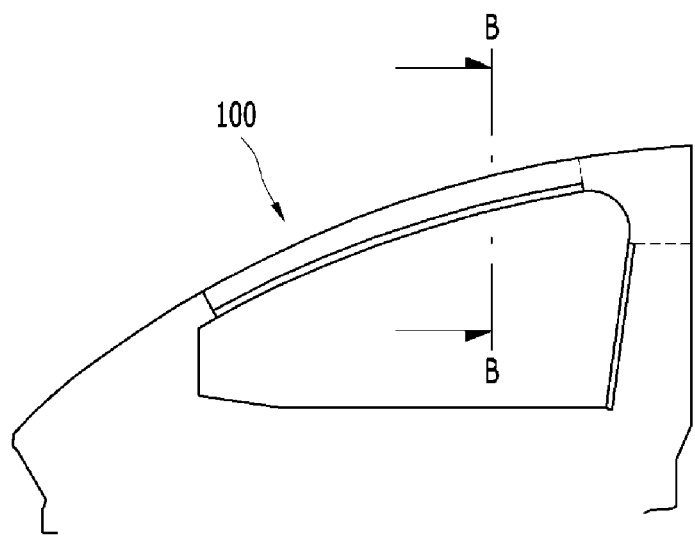
FIG. 1 is a schematic side view of a door that is equipped on a vehicle having an exemplary combination structure of the door according to the present invention.
Figure 2:
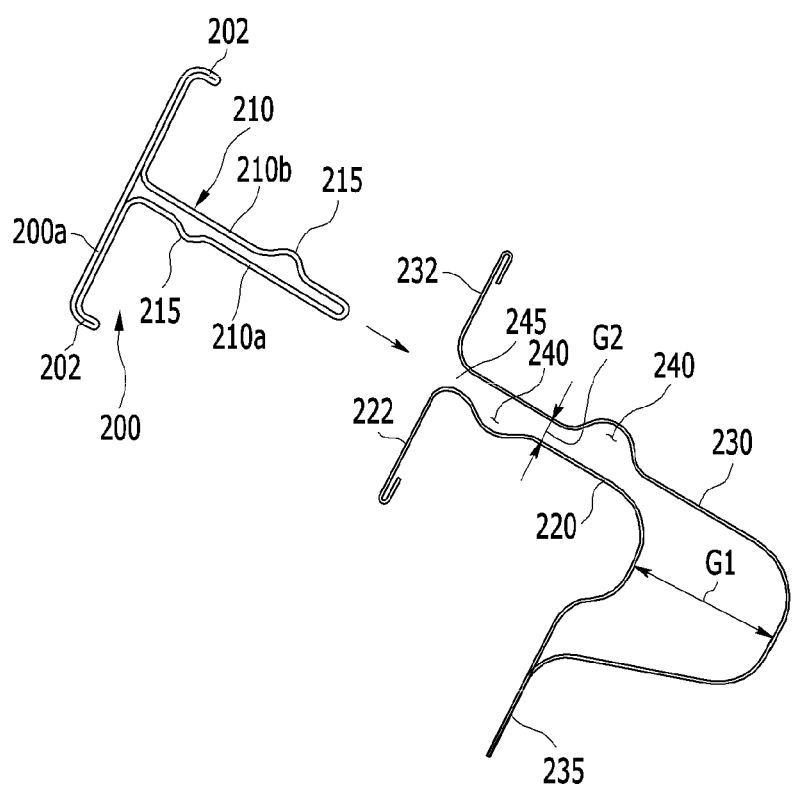
FIG. 2 is an exploded sectional view showing an exemplary combination structure of the door that is equipped on the vehicle according to the present invention.

FIG. 1 is a schematic side view of a door that is equipped on a vehicle according to various embodiments of the present invention, and FIG. 2 is an exploded sectional view showing a combination structure of the door that is equipped on the vehicle according to various embodiments of the present invention.

Referring to FIG. 1, a vehicle includes a door 100. A door glass (300 of FIG. 3) is combined with a window of the door 100, and the door glass 300 is disposed to move up and down thereon.

Referring to FIG. 2, an upper frame of the door includes a frame molding 200, an upper rail 220, and an inner panel 230. The frame molding 200 includes an exposure plate 200a and an insertion portion 210, and the insertion portion 210 includes a first element 210a and a second element 210b.

Each inner side end portion of the upper rail 220 and the inner panel 230 is welded through a welding portion 235, and an insertion hole 245 is formed at an outer side thereof, which is formed by a gap (G1 or G2) that is formed by the upper rail 220 and the inner panel 230.

And, the insertion hole 245 has a shape that is opened to an outside, a first arm 222 and a second arm 232 are respectively at an outside of the upper rail 220 and the inner panel 230, and the first arm 222 and the second arm 232 are respectively unfolded toward an upper side and a lower side based on the insertion hole 245.

A protrusion groove 240 is formed in the inner panel 230 and the upper rail 220 of the insertion hole 245 such that an interior diameter of the insertion hole 245 increases, and the protrusion groove 240 that is formed on the upper rail 220 and the protrusion groove 240 that is formed on the inner panel 230 are staggered.

The exposure plate 200a is a part that is exposed to an outside on the frame molding 200, and the insertion portion 210 is a part that is inserted into the insertion hole 245 that is formed between the upper rail 220 and the inner panel 230.

A lower end and an upper end of the exposure plate 200a is bent about 90 degrees to form a hook 202, and the hook 202 is respectively engaged with an end portion of the first arm 222 and the second arm 232 to be fixed thereto.

The insertion portion 210 is formed at a central portion of an inner side surface of the exposure plate 200a, the insertion portion 210 has about 90 degrees with the exposure plate 200a.

As shown in the drawings, the first element 210a and the second element 210b can be formed by bending one panel. Further, in various embodiments of the present invention, the exposure plate 200a, the first element 210a, and the second element 210b can be formed by being integrally bent.

A protrusion 215 is formed on an outer surface of the insertion portion 210 such that the exterior diameter of the insertion portion 210 is increased, and the protrusion 215 can be formed by bending one side of the first element 210a and the second element 210b.

Figure 3:
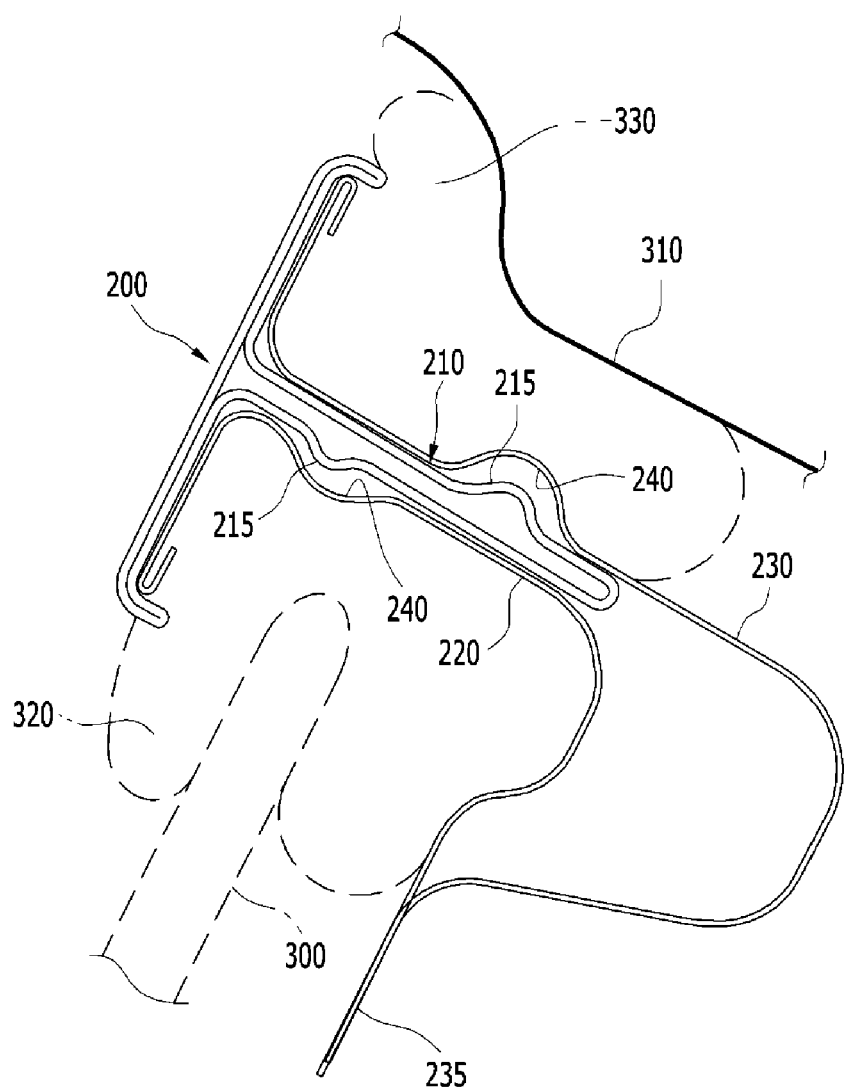
FIG. 3 is a cross-sectional view showing the exemplary combination structure of the door that is equipped on the vehicle that is formed along B-B line of FIG. 1.

FIG. 3 is a cross-sectional view showing a combination structure of a door that is equipped on a vehicle that is formed along B-B line of FIG. 1.

Referring to FIG. 3, a vehicle includes a door glass 300, a frame molding 200, an upper rail 220, an inner panel 230, a vehicle body 310, a first sealing member 320, and a second sealing member 330.

The door glass 300 is disposed on the door to be able to move in an upper direction and a lower direction, the upper end portion thereof is inserted into the gap of the welding portion 235 and the first arm 222, and a first sealing member 320 is interposed between the door glass 300 and the upper rail 220 to form a sealing structure.

One part of the vehicle body 310 is disposed with a distance from the inner panel 230 and a second sealing member 330 is disposed between the vehicle body 310 and the inner panel 230 to form a sealing structure between them.

The insertion portion 210 of the frame molding 200 is inserted into the insertion hole 245, and the hook 202 that is formed at both sides of the exposure plate 200a is engaged with an end portion of the first arm 222 and the second arm 232. And, the protrusions 215 that are formed on the insertion portion 210 are inserted into the protrusion grooves 240 that are formed on the inner panel 230 and the upper rail 220.

Further, the first element 210a and the second element 210b of the insertion portion 210 make a predetermined gap, and they are elastically deformed to contact one surface of the upper rail 220 and the inner panel 230.

In various embodiments of the present invention, when the frame molding 200 is engaged with the door, the frame molding 200 is not rotated and is moved in a width direction of the vehicle body 310 to be engaged with the door such that the assembly easiness is improved and the maintenance thereof becomes easy.

The insertion portion 210 and the protrusion 215 of the frame molding 200 may be made of a stainless steel (SUS), and therefore corrosion may be prevented and durability can be improved. Further, a double sided adhesive tape is not used between the frame molding 200 and the door to be able to fix the frame molding 200 on the door through the insertion portion 210 and the protrusion 215.

Also, the first arm 222 and the welding portion 235 of the upper rail 220 forms a space that the first sealing member 320 is disposed, the first sealing member is securely disposed, and the door glass is disposed to be able to move.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A combination structure of a door that is equipped on a vehicle, comprising:
    an upper rail formed by bending a metal plate and disposed to correspond to an edge of a door glass;
    an inner panel disposed by a distance from the upper rail to form an insertion hole and one side of the inner panel is fixed to the upper rail;
    a frame molding in which an insertion portion is formed on at least one side thereof and the insertion portion is inserted into the insertion hole formed between the upper rail and the inner panel;
    a vehicle body disposed by a distance from the inner panel; and
    a first sealing member disposed on the upper rail to form a sealing structure with the door glass and a second sealing member disposed between the vehicle body and the inner panel to form another sealing structure,
    wherein the frame molding includes:
        an exposure plate having an outside surface exposed to an outside; and
        the insertion portion that protrudes from a central portion of an inner side surface of the exposure plate and is inserted into the insertion hole,
    wherein a protrusion is formed on the insertion portion to be fixed on the insertion hole,
    wherein the insertion portion includes first and second elements that are disposed by a distance from each other and are fixed to each other, and the first element or the second element is transformed to form the protrusion, and
    wherein the first element and the second element face each other and the distance thereof is elastically transformed such that the first element and the second element closely contact an inner side surface of the insertion hole.

2. The combination structure of the door of claim 1, wherein the upper rail and the inner panel are respectively bent to form a protrusion groove at a position corresponding to the protrusion in the insertion hole.

3. The combination structure of the door of claim 1, wherein the exposure plate and the insertion portion are vertically disposed from each other and are integrally bent to be formed.

4. The combination structure of the door of claim 1, wherein an inner side of the one side of the inner panel and an inner side of the upper rail are fixed to each other through welding.

5. The combination structure of the door of claim 1, wherein a first arm that is bent toward an outside of the insertion hole to face an inner side surface of the exposure plate is formed at an outside of the upper rail, and
    a second arm that is bent toward the outside of the insertion hole corresponding to the first arm to face the inner side surface of the exposure plate is formed at an outside of the inner panel.

6. The combination structure of the door of claim 5, wherein a hook is formed on the frame molding by bending both end sides of the exposure plate to be engaged with the first arm and the second arm respectively.

* * * * *